United States Patent
Baba

(10) Patent No.: US 7,404,027 B2
(45) Date of Patent: Jul. 22, 2008

(54) SLAVE DEVICE IN INFORMATION PROCESSING SYSTEM, OPERATION CONTROL PROGRAM FOR SLAVE DEVICE, AND OPERATION CONTROL METHOD FOR SLAVE DEVICE

(75) Inventor: Tsutomu Baba, Nagano (JP)

(73) Assignee: Nidec Sanyko Corporation (JP)

( * ) Notice: Subject to any disclaimer, the term of this patent is extended or adjusted under 35 U.S.C. 154(b) by 227 days.

(21) Appl. No.: 11/259,387

(22) Filed: Oct. 26, 2005

(65) Prior Publication Data

US 2006/0095643 A1    May 4, 2006

(30) Foreign Application Priority Data

Oct. 28, 2004   (JP)   ............... 2004-314081

(51) Int. Cl.
G06F 13/14   (2006.01)
(52) U.S. Cl. .................................. 710/305; 710/63
(58) Field of Classification Search ............ 710/63, 710/305, 315; 326/37, 62
See application file for complete search history.

(56) References Cited

U.S. PATENT DOCUMENTS

| | | | | |
|---|---|---|---|---|
| 6,260,084 B1 * | 7/2001 | Wilson et al. | ................ | 710/38 |
| 6,442,734 B1 * | 8/2002 | Hanson et al. | ................ | 716/4 |
| 6,460,094 B1 * | 10/2002 | Hanson et al. | ................ | 710/8 |
| 6,493,084 B1 * | 12/2002 | Friend et al. | ................ | 356/402 |
| 6,601,124 B1 * | 7/2003 | Blair | ................ | 710/305 |
| 2005/0045726 A1 * | 3/2005 | Terlizzi | ................ | 235/454 |

FOREIGN PATENT DOCUMENTS

| | | | |
|---|---|---|---|
| EP | 1441524 A1 * | 7/2004 | |
| JP | 8-288979 | 11/1996 | |
| JP | 2001100877 A * | 4/2001 | |
| JP | 2003-187193 | 7/2003 | |

OTHER PUBLICATIONS

Universal serial Bus Specification Revision 2.0 Apr. 27, 2000 sections 7.1.5.2 and 7.1.7.5.*
Structured Computer Organization third edition Andrew S. Tanenbaum pp. 11-13. copyright 1990.*

* cited by examiner

*Primary Examiner*—Paul R Myers
(74) *Attorney, Agent, or Firm*—Cantor Colburn LLP

(57) ABSTRACT

A slave device communicating with a host device may include a program for controlling operation of the slave device. The program may include a discriminating function for discriminating types of communication interfaces through a control part provided in the slave device which controls the communication interfaces, a communicating function for communicating with the host device through the communication interface, an analyzing function for analyzing a command transmitted from the host device by utilizing a module to execute processing corresponding to each of the communication interfaces, and a controlling function for controlling operation of the slave device depending on a command after analyzing is executed by utilizing a single module which is not dependent on the communication interfaces.

9 Claims, 6 Drawing Sheets

[Fig.1]
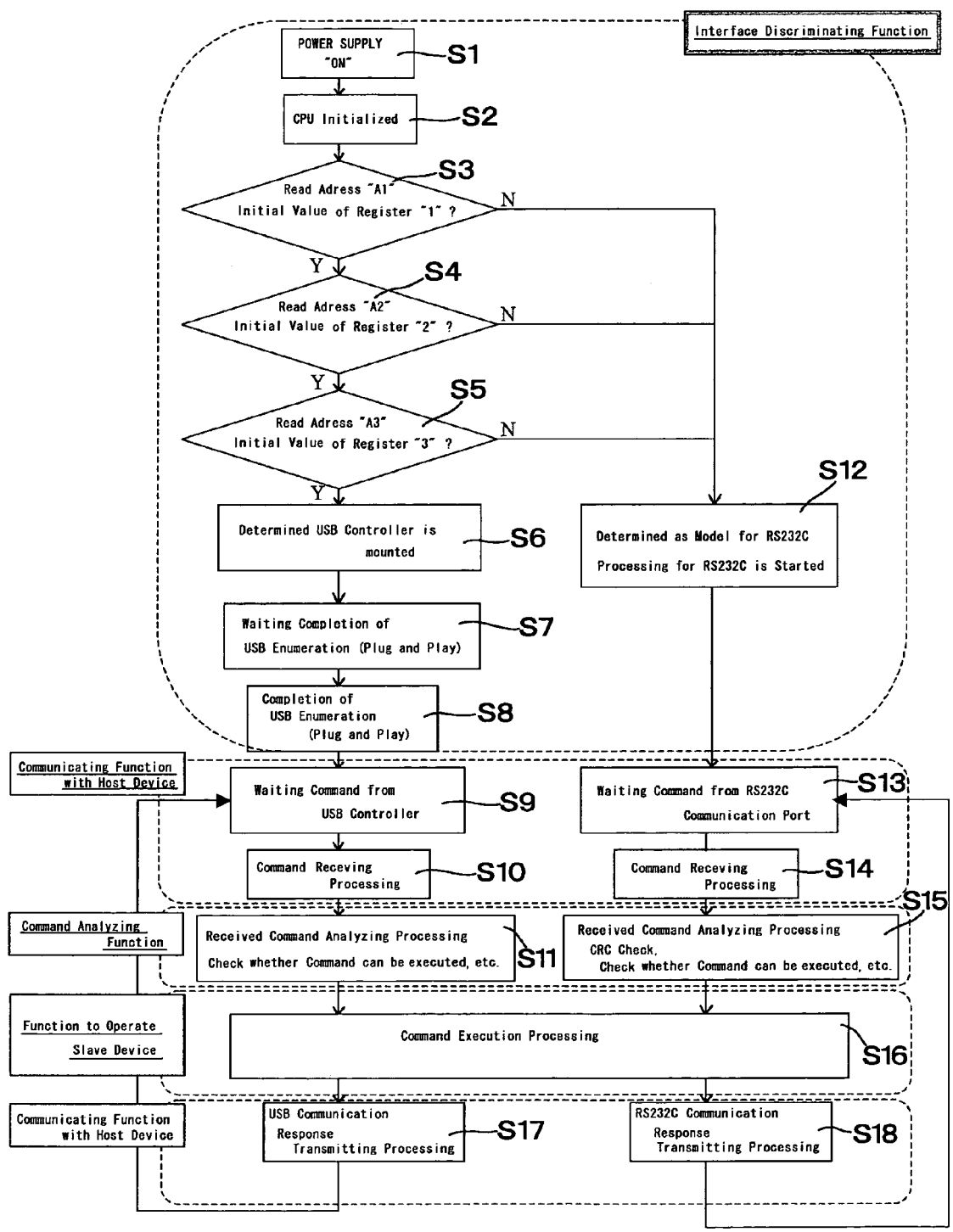

[Fig.2]
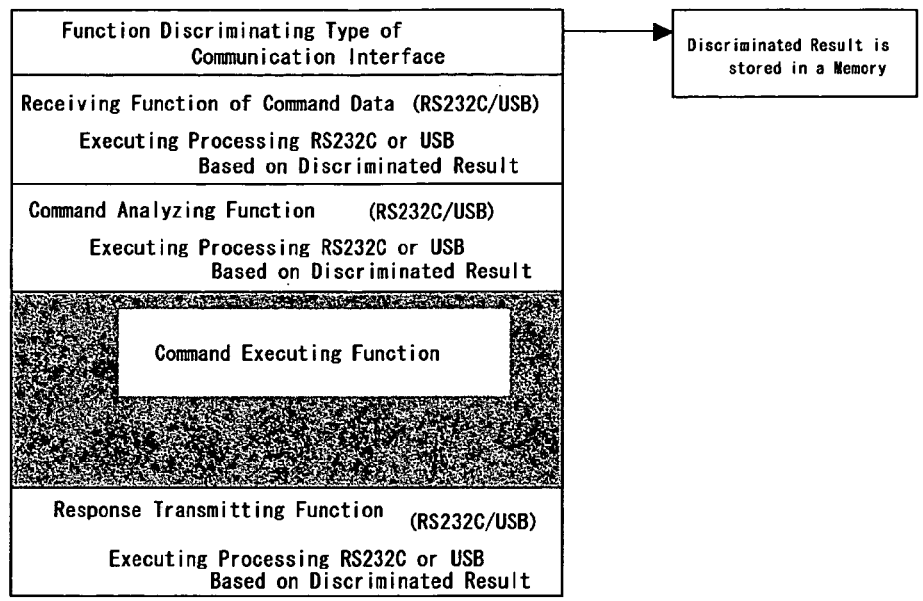
[Fig.3]
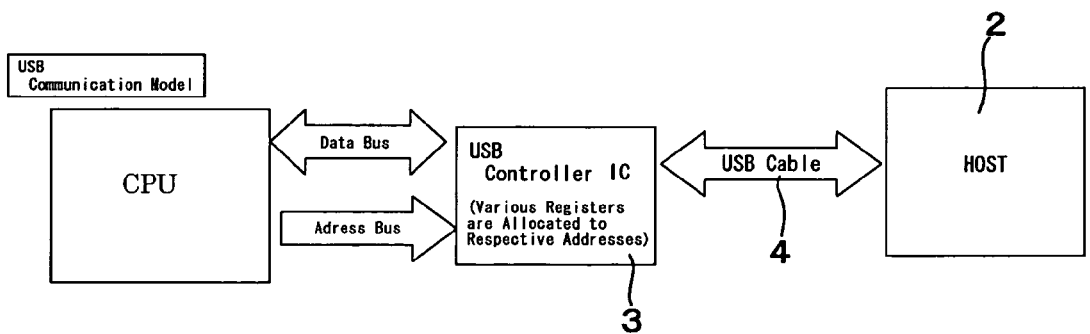

[Fig.4]
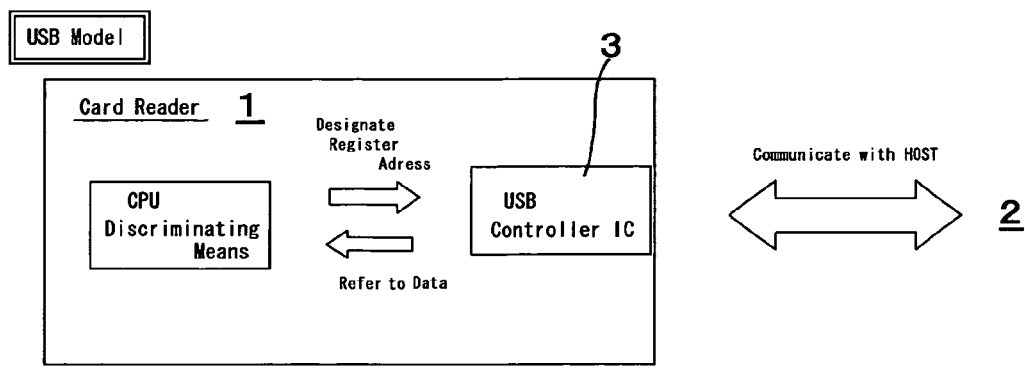
[Fig.5]
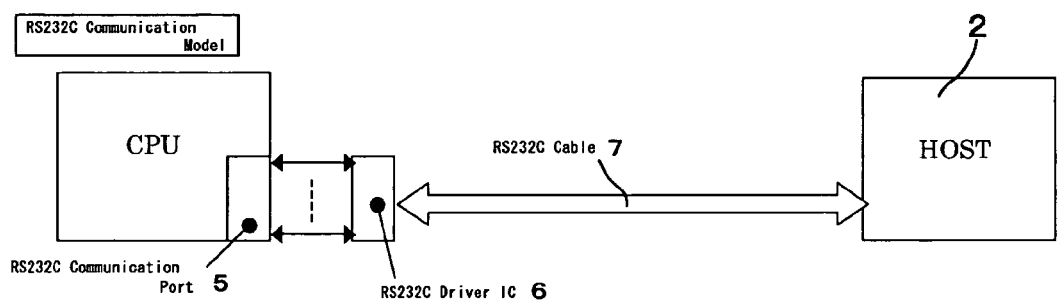

[Fig.6]

Example of USB Communiation Command (HID)

Device Receiving Command

| Report ID | Length | "C" | Parameter1 | Parameter2 | data 0 | ... | data N |

[Fig.7]

Example of USB Communication Command (HID)

Device Receiving Command

| Report ID | Length | "P" | Parameter1 | Parameter2 | data 0 | ... | data N |

[Fig.8]

Example of USB Communication Command (HID)

Device Receiving Command

| Report ID | Length | "N" | Parameter1 | Parameter2 | data 0 | ... | data N |

[Fig.9]

Example of RS232C Communication Command

Device Receiving Command

| STX | Length | "C" | Parameter1 | Parameter2 | data 0 | ... | data N | CRC |

[Fig.10]

Example of RS232C Communication Command

Response (Command Success)

| STX | Length | "P" | Parameter1 | Parameter2 | data 0 | ... | data N | CRC |

[Fig.11]

Example of RS232C Communication Command

Response (Command Failure)

| STX | Length | "N" | Parameter1 | Parameter2 | data 0 | ... | data N | CRC |

[Fig.12]
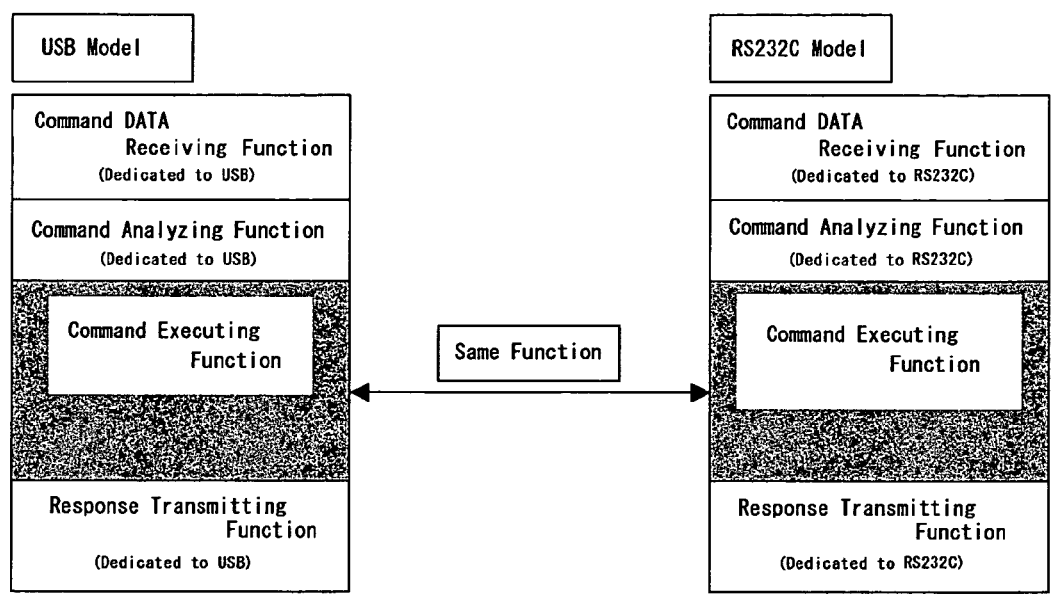

SLAVE DEVICE IN INFORMATION PROCESSING SYSTEM, OPERATION CONTROL PROGRAM FOR SLAVE DEVICE, AND OPERATION CONTROL METHOD FOR SLAVE DEVICE

CROSS REFERENCE TO RELATED APPLICATION

The present invention claims priority under 35 U.S.C. §119 to Japanese Application No. 2004-314081 filed Oct. 28, 2004, which is incorporated herein by reference.

FIELD OF THE INVENTION

An embodiment of the present invention may relate to a slave device in an information processing system, an operation control program for the slave device and an operation control method for the slave device. More specifically, an embodiment of the present invention may relate to improvement of an operation control in an information processing system.

BACKGROUND OF THE INVENTION

A system has been known in which a host device is combined with a slave device which communicates with the host device, executes processing corresponding to a situation and transmits a present state and a processed result to the host device. As an example of such system, a system is known in which a host computer (host device) is combined with a card reader (slave device). In such card readers, two different types of communication interfaces (input/output interface) such as RS232C and USB are used although the data-processing function is the same. In this case, their programs have been required to be managed independently.

As described above, in a card reader which communicates with a host device (for example, a host computer or a processing device such as a control device or an arithmetic device incorporated into a computer which is connected to the card reader), when different communication interfaces such as RS232C and USB are used, different programs are required to be integrated for every communication interface although the processing contents of data are the same (for example, see Japanese Patent Laid-Open No. Hei 8-288979). In other words, even when functions for carrying out a command from a host device are the same and are used for general purposes, it is the case that respective functions such as a command data receiving function, a command analyzing function, and a response transmitting function are formed to be non-general as dedicated to USB or RS232C, different programs are incorporated for every communication interface (see FIG. 12). In other words, a plurality of programs are prepared in which their substantial contents are the same but their specifications on communication are different.

Further, a card reader is disclosed which is provided with three different communication interfaces for RS232C, USB and LAN in order to communicate with a host device (for example, see Japanese Patent Laid-Open No. 2003-187193). In this card reader, data with regard to electronic money is received from the host device through a communication interface for USB, data with regard to a credit card is received from another host device through a communication interface for RS232C, and in this manner, data is communicated with each other.

However, when the management of different programs to every communication interface is executed as described above, in the case that a modification is required except a function on a communication section, for example, a common function, the respective programs are required to be modified and thus a lot of time and effort is needed. In addition, verifications whether modified programs operate without a problem or not are required to be performed for respective card readers whose communication interfaces are different and thus a development period becomes longer.

Further, there are similar problems in a card reader which is provided with, for example, three different types of communication interfaces in order to communicate with host devices. In other words, when each of the communication interfaces is set to be one-for-one with a host device that performs processing (for example, Japanese Patent Laid-Open No. 2003-187193), a common function is required to be modified in correspondence with each program because a program such as for RS232C and for USB is independently managed on the basis of an instruction from the host device.

In addition, in the above-mentioned card reader, when a system integrated with a communication interface for USB is changed to a communication interface for RS232C to communicate regarding electronic money, a program integrated with a communication interface for RS232C is independently managed separately from a program integrated with a communication interface for USB for communication regarding electronic money. Therefore, the integrated programs have to be modified every time a malfunction is corrected or security is enhanced. Moreover, verification whether the modified program is normally operated or not has to be executed and thus a lot of time and effort are needed.

SUMMARY OF THE INVENTION

In view of the problems described above, an embodiment of the present invention may advantageously provide a slave device in an information processing system which is capable of eliminating the management of programs different for each communication interface, reducing time, labor and cost when respective programs are modified and verified, and preventing the increase in cost and size of the apparatus. Further, an embodiment of the present invention may also advantageously provide an operation control program for the slave device and an operation control method for the slave device.

In order to solve the problems, the present inventor has eagerly investigated the above-mentioned prior art and found that, for example, in the latter prior art, regular communication interfaces are only changed according to their functions as USB is used for an electronic money DB (database) and RS232C is used for a credit DB when the DB is accessed. Further, the present inventor has found that the prior art does not disclose the technique in which the type of communication interface is discriminated to execute communication. In other words, the prior art does not disclose the method capable of discriminating whether the electronic money DB is accessed through RS232C or another communication interface.

Thus, according to an embodiment of the present invention, there may be provided a slave device in an information processing system which communicates with a host device, executes processing corresponding to a situation and transmits a present state and a processed result to the host device. The computer of the slave device is provided with a program for controlling operation of the slave device to execute the processing corresponding to the situation. The program includes a discriminating function for discriminating types of communication interfaces through a control part provided in the slave device that controls the communication interfaces, a communicating function for communicating with the host device through the communication interface, an analyzing function for analyzing a command transmitted from the host device by utilizing a module to execute processing corresponding to each of the communication interfaces, and a controlling function for controlling operation of the slave device depending on a command after analyzing is executed by utilizing a single module which is not dependent on the communication interfaces.

Based on the above-mentioned consideration, the present inventor has paid attention to that, even when slave devices (for example, card reader) in the information processing system are different models whose communication interfaces are different but substantial contents are the same, the same program can be integrated to a computer provided in respective slave devices. In this case, the program is provided with a discriminating function for discriminating the communication interface (and the communication method based on the interface) through a control part controlling the communication interface and a communicating function for performing communication by using the communication interface (and communicating method) that is discriminated. When discrimination processing is executed by software, only one program is capable of coping with models whose communication interfaces are different but their essential contents are the same. Therefore, even when an amendment is required, only one program is required to be amended and only one verification is required after the amendment.

In accordance with an embodiment of the present invention, the slave device in an information processing system is preferably provided with discriminating function which is executed at the time of setting or resetting of a power supply.

Further, in accordance with an embodiment of the present invention, the slave device in an information processing system is preferably provided with only one communication port for the communication interfaces.

Further, in accordance with an embodiment of the present invention, the communication interfaces are for USB and for RS232C, and the discriminating function includes referring to the content of an address allocated in a specified register provided in a USB controller IC incorporated in the slave device in the case that the communication interface is for USB, and discriminating the type of the communication interface based on the content obtained.

In this case, it may be preferable that a register showing a characteristic initial value is previously selected as the specified register.

Further, it may be also preferable that the specified register is provided with a plurality of registers.

Further, in accordance with an embodiment of the present invention, the slave device is a card reader.

In addition, according to an embodiment of the present invention, there may be provided an operation control program for a slave device in an information processing system which causes a computer in the slave device to communicate with a host device, to execute processing corresponding to a situation and to transmit a present state and a processed result to the host device. The operation control program includes a discriminating function for discriminating types of communication interfaces through a control part provided in the slave device which controls the communication interfaces, a communicating function for communicating with the host device through the communication interface, an analyzing function for analyzing a command transmitted from the host device by utilizing a module to execute processing corresponding to each of the communication interfaces, and a controlling function for controlling operation of the slave device depending on a command after analyzing is executed by utilizing a single module which is not dependent on the communication interfaces.

In addition, according to an embodiment of the present invention, there may be provided an operation control method for a slave device in an information processing system which causes a computer in the slave device to communicate with a host device, to execute processing corresponding to a situation and to transmit a present state and a processed result to the host device. The operation control method includes discriminating types of communication interfaces through a control part provided in the slave device which controls the communication interfaces, communicating with the host device through the communication interface, analyzing a command transmitted from the host device by utilizing a module to execute processing corresponding to each of the communication interfaces, and controlling operation of the slave device depending on a command after analyzing is executed by utilizing a single module which is not dependent on the communication interfaces.

As described above, according to the slave device in an information processing system in accordance with an embodiment of the present invention, the program can be managed in a unified manner and thus different programs for each of the communication interfaces are not required to be managed as before. Therefore, even when amending of software is required, the amendment can be executed with less time and labor, and the verification is required once, and thus time, labor and cost in the system management can be remarkably reduced. In this manner, since one program is provided with versatility so as to cope with a plurality of communication interfaces, cost and time period for development becomes effective, and thus the development efficiency can be remarkably improved.

In accordance with an embodiment of the present invention, the slave device in an information processing system is preferably provided with discriminating function which is executed at the time of setting or resetting of a power supply. Therefore, the discrimination or confirmation of the communication interfaces can be executed every time of setting or resetting of the power supply.

In accordance with an embodiment of the present invention, the slave device in an information processing system is preferably provided with only one communication port for the communication interfaces and thus cost reduction and downsizing of the device can be obtained. Further, since only one communication port is provided, the problem does not occur in which the connection is performed to an incorrect communication port. In addition, there is no possibility of being intercepted by using the communication port which is not used and thus a high degree of security can be obtained.

In accordance with an embodiment of the present invention, in the system where the communication interface is either for USB or RS232C, the communication interface can be discriminated as the USB or the RS232C. In this case, the discrimination of the type of communication interface is executed by means of obtaining the value of the address of the specified register in the USB controller IC incorporated in the slave device that is referred to when the communication interface is for USB, and the USB and the RS232C can be discriminated based on the obtained value.

In accordance with an embodiment of the present invention, a register showing a characteristic initial value is previously selected as the specified register. In this case, the type of communication interface can be discriminated by referring to this characteristic initial value.

In accordance with an embodiment of the present invention, the specified register is preferably provided with a plurality of registers. In this case, the type of communication interface can be discriminated by referring to characteristic values of the plurality of registers.

In accordance with an embodiment of the present invention, the discrimination of the type of communication interface can be applied to a card reader constructing an information processing system.

Further, according to the operation control program for a slave device in an information processing system in accordance with an embodiment of the present invention, the program can be managed in a unified manner and thus different programs for each of the communication interfaces are not required to be managed as before. Therefore, even when amending of software is required, the amendment can be executed with less time and labor, and the verification is required once, and thus time, labor and cost in the system management can be remarkably reduced. In this manner, since this one program is provided with versatility so as to cope with a plurality of communication interfaces, cost and time period for development becomes effective, and thus the development efficiency can be remarkably improved.

Also, according to the operation control method for a slave device in an information processing system in accordance with an embodiment of the present invention, the program can be managed in a unified manner and thus different programs for each of the communication interfaces are not required to be managed as before. Therefore, even when amending of software is required, the amendment can be executed with less time and labor, and the verification is required once, and thus time, labor and cost in the system management can be remarkably reduced. In this manner, since this one program is provided with versatility to cope with a plurality of communication interfaces, cost and period for development becomes effective, and thus the development efficiency can be remarkably improved.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a flow chart showing processing carried out by an operation control program for a slave device in an information processing system in accordance with an embodiment of the present invention.

FIG. 2 is a schematic explanatory view showing functions of an operation control program in accordance with an embodiment of the present invention and that helps to show the differences in comparison to the functions of a conventional operation control program.

FIG. 3 is a simplified block diagram showing an entire structure from a CPU to a host computer in the case that a communication interface is for USB.

FIG. 4 is a simplified view showing a state of transmission and reception of data between a CPU and an USB controller IC shown in FIG. 3.

FIG. 5 is a simplified block diagram showing an entire structure from a CPU to a host computer in the case that a communication interface is for RS232C.

FIG. 6 is a chart showing an example of a device reception command in USB communication commands.

FIG. 7 is a chart showing an example of a response at the time of command success in USB communication commands.

FIG. 8 is a chart showing an example of a response at the time of command failure in USB communication commands.

FIG. 9 is a chart showing an example of a device reception command in RS232C communication commands.

FIG. 10 is a chart showing an example of a response at the time of command success in RS232C communication commands.

FIG. 11 is a chart showing an example of a response at the time of command failure in RS232C communication commands.

FIG. 12 is a schematic view showing a function of a conventional operation control program.

DETAILED DESCRIPTION OF THE PREFERRED EMBODIMENTS

Several embodiments of the present invention will be described in detail below with reference to the accompanying drawings.

An embodiment of the present invention is shown in FIGS. 1 through 11. A slave device 1 in an information processing system in accordance with an embodiment of the present invention communicates with a host device 2 in the information processing system. The slave device 1 executes a processing corresponding to a command received from the host device 2 and transmits its present state and a processed result to the host device 2. In the case of the slave device 1 in accordance with an embodiment of the present invention, a computer of the slave device 1 is provided with a program for controlling operations of the slave device 1 depending on commands from the host device 2. Further, the program in the computer of the slave device 1 is provided with a discriminating function for discriminating the type of communication interface through a control part for controlling the communication interface provided in the slave device, a communicating function for communicating with the host device 2 through the communication interface, an analyzing function for analyzing a command transmitted from the host device 2 by utilizing a module which executes a processing corresponding to each communication interface, and a controlling function for controlling an operation of the slave device 1 depending on a command after the analysis is executed by utilizing a single module which is not depended on the communication interface.

As an example of the slave device 1 in an information processing system in accordance with an embodiment of the present invention, a card reader to which the present invention is applied will be described below, which reads information recorded in a card and writes renewal information when necessary (hereinafter, referred to as "card reader 1"). On the other hand, a "host device" in accordance with an embodiment of the present invention is, for example, a host computer or a processing device such as a control device and an arithmetic device incorporated in a computer. In an embodiment of the present invention, since the slave device is a card reader 1, a host computer connected to the card reader 1 is an example of a host device (hereinafter, referred to as "host computer 2").

The card reader 1 in accordance with an embodiment of the present invention is provided with a discriminating function for discriminating a communication method, in other words, a function to distinguish which communication interface (I/O interface) is effective and to execute communication. Concretely, a CPU (Central Processing Unit) in the card reader 1 discriminates which communication interface is effective between the card reader 1 and the host computer 2 (host device) through a control part 3 controlling the communication interface (see FIGS. 3 through 5). A communication method in this case, in other words, which communication interface and commands based on the communication interface are utilized may be changed in accordance with which the card reader 1 and the host computer 2 may utilize (may have a possibility to utilize). In an embodiment of the present invention, among various communication interfaces, two communication interfaces such as RS232C (Recommendation Standard-232C) and USB (Universal Serial Bus) which are spread relatively widely (or have been spreading widely) are adopted and an embodiment in the case that both of the communication interfaces may be used will be described below (see FIG. 3).

First, the entire structure of the card reader 1 and the host computer 2 will be described with reference to block diagrams (see FIGS. 3 through 5). In the case that the card reader 1 and the host computer 2 are a USB communication model, the host computer 2 and a USB controller IC as a control part (shown by the notational symbol "3" in FIGS. 3 and 4) are electrically connected to each other through a USB cable 4 (see FIG. 3). The USB controller IC 3 is an integrated circuit that is incorporated in the card reader 1. The USB controller IC 3 in accordance with an embodiment of the present invention is provided with, for example, registers inside of the USB controller IC 3. The registers provided in the USB controller IC 3 are allocated to respective addresses (see FIG. 3). Further, it is preferable that a register showing a characteristic initial value is previously selected as a specified register from the registers. In this case, it can be accurately distinguished whether the communication interface is, for example, for USB or not by referring to the characteristic initial value. In addition, in this case, it is also preferable that a plurality of specified registers showing a characteristic initial value are provided. When constructed as described above, characteristic register's values, which are respectively different, can be referred to by the number of the characteristic registers.

An address number is transferred from a CPU to the USB controller IC 3 between the USB controller IC 3 and the CPU through an address bus and data are bi-directionally transferred through a data bus (see FIG. 3). When the card reader 1 and the host computer 2 are connected to each other as described above, firstly, data are converted to an effective address in the CPU as required and transferred to the USB controller IC 3 to designate the address of a specified register (see FIG. 4). The USB controller IC 3 transfers the data corresponding to this address value to the CPU and the CPU refers to the data. The CPU refers to the value of the specified register inside of the USB controller IC 3 by utilizing such a processing structure and discriminates the type of a communication interface based on the value obtained as described above.

Next, the case will be described below in which the card reader 1 and the host computer 2 are an RS232C communication model in the entire structure of the card reader 1 and the host computer 2 (see FIG. 5). In this case, a CPU is provided with, for example, an RS232C communication port 5 and an RS232C driver IC 6 is electrically connected to the RS232C communication port 5. The RS232C driver IC 6 and the host computer 2 are connected to each other by an RS232C cable (cross cable) 7 (see FIG. 5).

The operation control program which is stored in this card reader 1 and the operation control realized by the operation control program will be described below with reference to a flow chart (see FIG. 1). The operation control program causes the computer of the card reader 1 to perform communication with the host computer 2 and causes the computer of the card reader 1 to perform processing according to received commands from the host computer 2 to transmit its present state and processed results to the host computer 2. Further, the operation control program causes the computer of the card reader 1 to perform communication with the host computer (host device) 2 by a protocol in conformity with the communication interface that is distinguished. Various specific functions, which are provided in the operation control program in accordance with an embodiment of the present invention, will be successively described with reference to the flow chart shown in FIG. 1.

FIG. 1 shows an example of a processing flow when an operation of the card reader 1 is controlled by the operation control program. In FIG. 1, each of "interface discriminating function", "communicating function with a host device", "command analyzing function", and "function to operate a slave device", which are capable of being realized by the operation control program, is shown by surrounding each function with a broken line.

First, "interface discriminating function" will be described below. (see steps S1 through S8 and step S12 in FIG. 1). This is a function which discriminates the type of a communication interface provided in the card reader 1 through a control part for controlling the communication interface. For example, in accordance with an embodiment of the present invention, the type of a communication interface whether it is the USB or the RS232C is discriminated by referring to the specified address allocated to the controller IC 3 which is incorporated in the case where the communication interface is the USB. Processing steps are as follows. First, the power supply of the card reader 1 is turned "ON" (step S1), the CPU is initialized (step S2), and then data of three specified addresses are referred to. In other words, the address value of the specified address "A1" is read by a CPU and it is judged whether this value matches with the characteristic initial value of a register 1 of the USB controller IC 3 (step S3). When matched, similarly, it is judged whether the address value of an address "A2" and the specified characteristic initial value of a register 2 are matched with each other (step S4) and then, it is judged whether the address value of an address "A3" and the specified characteristic initial value of register 3 are matched with each other (step S5). When all of them are matched with each other, it is determined that an USB controller (including an IC) is mounted on the information processing system (or, card reader 1) (step S6).

On the other hand, either of them are not matched with each other in the steps S3 through S5, it is determined that the information processing system (or, card reader 1) is a model for RS232C communication and processing as the model for RS232C communication is started (step S12). In the step S6, when it is determined that an USB controller (including an IC) is mounted, the completion of "Enumeration" of the USB is awaited (step S7). "Enumeration" commonly means operations to acquire a list including a user account, an IP address, a host name, etc., which are registered in the information processing system. For example, in the case that the USB executes "Enumeration" as shown in the step S7, the "Plug and Play" operation, in other words, an operation or a function automatically recognizing another device corresponds to the "Enumeration". When the "Enumeration" of the USB is completed (step S8), the next step S9 is executed. "Interface discriminating function" is finished by executing the step S8 or the above-mentioned step S12.

Next, "communicating function with host device" will be described below (see steps S9 and S10 and steps S13 and S14 in FIG. 1). This is a function by which the communication with the host computer 2 is executed through a communication interface (USB or RS232C). In accordance with an embodiment of the present invention, after the "Enumeration" of the USB in the step S8 is completed, reception of a command from the USB controller (including IC) is waited (step S9) and then a received command is processed (step S10), whose steps correspond to the "communicating function with host device" (see FIG. 1). This reception of the command means that the communication with the host device (in this case, the host computer 2) has been executed. Further, when the communication interface is the RS232C, its function is the same as the above-mentioned case and the above-mentioned processing is similarly performed. In other words, reception of a command from the RS232C communication port 5 is waited (step S13) and, when the command is received, it is processed (step S14).

Next, "command analyzing function" will be described below (see step S11 and step S15 in FIG. 1). This is a function by which the command transmitted from the host computer 2 is analyzed by utilizing a module which executes a processing corresponding to the respective communication interfaces. For example, in accordance with an embodiment of the present invention, the command received and processed in the step S10 or the step S14 is analyzed, and checks and the like are executed whether the command can be executed now or not (step S11), or a CRC check (cyclic redundancy check) and the like are executed (step S15) in the case of the RS232C.

Next, the "function to operate a slave device" will be described below (see step S16 in FIG. 1). This is a function by which the operation of the card reader 1 is controlled by utilizing a single module, which does not depend upon the communication interface, in response to the command after having analyzed by means of the "command analyzing function". Here, the "single module which does not depend upon communication interface" means a module having versatility whose communication interface is available to both of the USB and the RS232C. Concretely described in detail, for example, conventional respective functions such as a command data reception function, a command analyzing function and a response transmitting function are formed without versatility (see FIG. 12). On the other hand, in accordance with an embodiment of the present invention, each of the above-mentioned functions is formed with versatility and the program is organized which can be directly utilized in both of the USB and the RS232C communication interfaces (see FIG. 2). In other words, this program is the same as the conventional program with respect to having a command execution function with versatility. In accordance with an embodiment of the present invention, in addition to the above-mentioned command execution function with versatility, the respective functions such as the command data reception function, the command analyzing function and the response transmitting function are organized to provide with versatility which can execute either processing of the RS232C and the USB based on the discrimination result, and thus this program is constructed as a general purpose program which is available regardless of the type of the communication interface (see FIG. 2).

The operation control program and the contents of the operation control realized by this operation control program have been described above with reference to the flow chart. Next, the concrete example of a communication command will be described below (see FIGS. 6 through FIG. 11). First, an example of a device reception command in the USB communication is shown in FIG. 6. In this case, the card reader 1 receives a command in which the data of a certain field is "C" (steps S9 and S10). The card reader 1 analyzes and processes this command and, when it is possible to be executed, the command is executed and processed (steps S11 and S16). As a result, for example, the response data in which the data of a certain field is "P" is transmitted to the host computer 2 at the time of success of command (see FIG. 7). On the contrary, for example, the response data in which the data of a certain field is "N" is transmitted to the host computer 2 at the time of failure of command (see FIG. 8). As shown in FIGS. 6 through 8, core data portions in the commands and responses are substantially common to each other.

Next, an example of a device reception command in the RS232C communication is shown in FIG. 9. In this case, the card reader 1 receives the command in which the data of a certain field is "C" (steps S13 and S14). The card reader 1 analyzes and processes this command and, when it is possible to be executed, the command is executed and processed (steps S15 and S16). As a result, for example, the response data in which the data of a certain field is "P" is transmitted to the host computer 2 at the time of success of command (see FIG. 10). On the contrary, for example, the response data in which the data of a certain field is "N" is transmitted to the host computer 2 at the time of failure of command (see FIG. 11).

A further concrete embodiment of the present invention will be described below. A USB model may be constructed such that, for example, a USB controller IC3 (ML60851Dor 2A) made by Oki Electric Industry is mounted. Further, the operation control program incorporated into the card reader 1 is preferably provided with a discriminating function to discriminate whether the USB controller IC3 (ML60851Dor 2A) is mounted or not at the time of setting (resetting) of a power supply. In this case, when it is confirmed that the USB controller IC3 (ML60851Dor 2A) is mounted, it is judged that the card reader 1 is the USB model. On the other hand, when it is confirmed that the USB controller IC3 (ML60851Dor 2A) is not mounted, it is judged that the card reader 1 is the RS232C model. After that, based on the discriminated result, the card reader 1 communicates with a host device (host computer 2) with the communication protocol which is predetermined for either communication method to execute processing as the card reader 1. Further, there are some specified registers among the registers of the USB controller IC3 (ML60851Dor 2A) in which initial values are set just after the IC is reset. For example, when the registers in which initial values are set to be characteristic values are previously selected as the specified registers, the operation control program may be constructed so as to refer to the addresses of the specified registers indicating the characteristic values at the time of setting up the power supply (or resetting). When the result of reference indicates a value which is different from the characteristic value as the criterion, it is judged that the USB controller IC3 made by Oki Electric Industry (ML60851D or 2A) is not mounted.

As described above, according to the card reader 1 in accordance with an embodiment of the present embodiment, in an information processing system in which all two or more communication interfaces have a possibility to be utilized, the effective communication interface can be discriminated only by one program, which causes to be capable of selecting a communication means suitable for the system to execute a normal communication. In this manner, according to the information processing system in accordance with an embodiment of the present invention, programs which are conventionally separately prepared for respective communication interfaces can be managed in a unified manner and, even when an amendment of malfunction such as bugs on the software is required, the amendment and verification of only one program is required and thus development efficiency can be remarkably improved.

The present invention has been described in detail using the embodiments, but the present invention is not limited to the embodiments described above and many modifications can be made without departing from the present invention. For example, in an embodiment of the present invention, the USB controller IC3 made by Oki Electric Industry Co., Ltd. is used as a concrete example but the present invention is not limited to this USB controller IC3 and another USB controller IC3 may be used. In this case, when it is discriminated at the time of setting or turning "ON" (or resetting) of a power supply that the controller IC3 is mounted, the same structure as described above may be utilized.

Further, as described above, it is preferable to discriminate the type of communication interface at the time of setting or turning "ON" (or resetting) of a power supply. Therefore, it is preferable to discriminate whether the type of communication interface is USB or RS232C at the first power supply setting and the result information is stored in a nonvolatile memory or the like of a computer (see FIG. 2). In this case, communication method can be determined afterwards based on the information.

In addition, in an embodiment of the present invention, the power supply of the card reader 1 is turned "ON" (step S1), the CPU is initialized (step S2), and then the data of three addresses "A1", "A2" and "A3" are referred to. However, the present invention is not limited to this embodiment and the addresses and the reference portions may be appropriately changed depending on an information processing system or the structure of a card reader (slave device) 1. In order to enhance the accuracy of type discrimination of the communication interface (for example, whether it is the RS232C or the USB), a specified register where a characteristic value is previously stored as the initial value is preferably selected and, in addition, a plurality of specified registers are preferably selected and a plurality of address references are performed.

Further, in an embodiment of the present invention, the RS232C and the USB are utilized as a communication interface but the present invention is not limited to this embodiment. For example, in the information processing system including the card reader 1 described above and the like, even when a communication method which uses another interfaces is used, the discrimination can be performed similarly to the above-mentioned embodiment by providing the structure to recognize the existence of the communication controller.

In addition, in an embodiment of the present invention, the information processing system is described in which the slave device is the card reader 1 and the host device is the host computer 2 but the present invention is not limited to this embodiment. The important point is that the present invention is capable of being applied to an information processing system in which communication is performed between a host device and a slave device and the slave device executes processing depending on a command received from the host device and then transmits a present state and the processing result to the host device.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, and all changes which come within the meaning and range of equivalency of the claims are therefore intended to be embraced therein.

While the preferred embodiments of the present invention have been described using specific terms, such description is for illustrative purposes only, and it is to be understood that changes and variations may be made and different terminology used without departing from the spirit or scope of the appended claims.

What is claimed is:

1. A slave device in an information processing system which communicates with a host device through a communication interface of the slave device, executes processing corresponding to a situation, and transmits a present state and a processed result to the host device, comprising:
 a program provided in a computer of the slave device for controlling operation of the slave device to execute the processing corresponding to the situation,
 wherein the program comprises:
  a discriminating function for discriminating types of communication interfaces of the slave device though a control part provided in the slave device which controls the communication interfaces;
  a communicating function for communicating with the host device through the communication interface;
  an analyzing function for analyzing a command transmitted from the host device by utilizing a module to execute processing corresponding to each of the communication interfaces; and
  a controlling function for controlling operation of the slave device depending on a command after analyzing is executed by utilizing a single module which is not dependent on the communication interfaces;
 wherein the discriminating function is structured to read a content of a predetermined address on the slave device; and
 the discriminating function is structured to identify the communication interface of the slave device as a USB-type communication interface if the content of the predetermined address matches a characteristic initial value, and the discriminating function is structured to identify the communication interface of the slave device as not a USB-type communication interface if the content of the predetermined address does not match a characteristic value.

2. The slave device in an information processing system according to claim 1, wherein the discriminating function is executed at the time of setting or resetting of a power supply.

3. The slave device in an information processing system according to claim 1, further comprising only one communication port for the communication interfaces.

4. The slave device in an information processing system according to claim 1, wherein the communication interfaces are for USB and for RS232C, and the discriminating function includes referring to a content of an address allocated in a specified register provided in a USB controller IC incorporated in the slave device in the case that the communication interface is for USB, and discriminating the type of the communication interface based on the content obtained.

5. The slave device in an information processing system according to claim 4, wherein a register showing a characteristic initial value is previously selected as the specified register.

6. The slave device in an information processing system according to claim 5, wherein the specified register is provided with a plurality of registers.

7. The slave device in an information processing system according to claim 1, wherein the slave device is a card reader.

8. An operation control program for a slave device in an information processing system which causes a computer provided in the slave device to communicate with a host device through a communication interface of the slave device, to execute processing corresponding to a situation and to transmit a present state and a processed result to the host device, comprising:
- a discriminating function for discriminating types of communication interfaces of the slave device though a control part provided in the slave device which controls the communication interfaces;
- a communicating function for communicating with the host device through the communication interface;
- an analyzing function for analyzing a command transmitted from the host device by utilizing a module to execute processing corresponding to each of the communication interfaces; and
- a controlling function for controlling operation of the slave device depending on a command after analyzing is executed by utilizing a single module which is not dependent on the communication interfaces;
- wherein the discriminating function is structured to read a content of a predetermined address on the slave device; and
- the discriminating function is structured to identify the communication interface of the slave device as a USB-type communication interface if the content of the predetermined address matches a characteristic initial value, and the discriminating function is structured to identify the communication interface of the slave device as not a USB-type communication interface if the content of the predetermined address does not match a characteristic value.

9. An operation control method for a slave device in an information processing system which causes a computer provided in the slave device to communicate with a host device through a communication interface of the slave device, to execute processing corresponding to a situation and to transmit a present state and a processed result to the host device, comprising:
- discriminating types of communication interfaces of the slave device through a control part provided in the slave device which controls the communication interfaces;
- communicating with the host device through the communication interface;
- analyzing a command transmitted from the host device by utilizing a module to execute processing corresponding to each of the communication interfaces; and
- controlling operation of the slave device depending on a command after analyzing is executed by utilizing a single module which is not dependent on the communication interfaces;
- wherein the discriminating function is structured to read a content of a predetermined address on the slave device; and
- the discriminating function is structured to identify the communication interface of the slave device as a USB-type communication interface if the content of the predetermined address matches a characteristic initial value, and the discriminating function is structured to identify the communication interface of the slave device as not a USB-type communication interface if the content of the predetermined address does not match a characteristic value.

* * * * *